United States Patent [19]

Aaroen

[11] 4,260,859
[45] Apr. 7, 1981

[54] METHOD AND APPARATUS FOR DETECTING TRANSMISSION SYSTEM FAILURES IN A COMMUNICATIONS NETWORK

[75] Inventor: James E. Aaroen, Somonauk, Ill.

[73] Assignee: Bell Telephone Laboratories, Incorporated, Murray Hill, N.J.

[21] Appl. No.: 114,642

[22] Filed: Jan. 23, 1980

[51] Int. Cl.$^3$ .............................................. H04B 3/46
[52] U.S. Cl. ................................. 179/175.3 R; 370/13
[58] Field of Search ................................... 370/13, 16; 179/175.3 R, 175.3 S, 175.2 R, 175.2 C, 175.2 D, 18 ES, 8 A, 8 R

[56] References Cited

U.S. PATENT DOCUMENTS

| | | | |
|---|---|---|---|
| 3,344,241 | 9/1967 | Harmon et al. | 179/175.3 R |
| 3,809,818 | 5/1974 | Johnston | 179/175.3 R |
| 4,066,843 | 1/1978 | Waks et al. | 179/8 A |

Primary Examiner—Thomas A. Robinson
Attorney, Agent, or Firm—Charles H. Davis

[57] ABSTRACT

The failure of an interoffice carrier transmission system is detected by monitoring the signaling irregularities on the trunks served by the system. When at least two trunks fail to return a "start-dial" signal from the terminating office, all trunks are removed from service. The trunks are periodically tested to ascertain when the carrier system has been restored. The trunks are tested less frequently for prolonged carrier failures and at least two trunks, including the last trunk to fail, must pass the test before the carrier system is considered restored to service.

11 Claims, 8 Drawing Figures

METHOD AND APPARATUS FOR DETECTING TRANSMISSION SYSTEM FAILURES IN A COMMUNICATIONS NETWORK

TECHNICAL FIELD

This invention relates to communication systems, and particularly, to arrangements for detecting trouble in telephone networks. In a more particular aspect, this invention relates to a method and apparatus for detecting transmission system failures in a telephone network.

BACKGROUND ART

Communication networks are made up of a plurality of switching offices which serve the customer stations. These switching offices are interconnected by interoffice trunks to permit any customer station served by any office in the network to be connected to any other station served by any other office.

The amount of traffic, i.e., calls between offices, determines the number and type of interoffice trunking facilities. If the distance between offices and the amount of traffic warrants it, the individual trunks may be multiplexed on a common transmission media thus eliminating separate metallic talking paths between the offices for each trunk circuit. In one such system twelve separate trunk circuits are frequency multiplexed on a common analog carrier system between two switching offices. A savings in cable pairs is realized at the risk of a multiplicity of trunk outages if the carrier system should fail.

Recognizing the serious nature of carrier transmission system failures, system designers have taken steps to detect and report carrier failures and thereby minimize trunk group outages.

For example, the carrier terminals at each end of the carrier system have been provided with alarm arrangements to alert maintenance personnel if a carrier system fails. In addition, if the switching office at the carrier terminal is one of the more modern types having a stored program controlled processor, the processor can scan the carrier alarm circuit to detect the carrier failure. Having detected the failure, the processor can then automatically busy the trunks associated with the failed system.

While these arrangements are generally suited for their intended purposes, they lack certain features found in the present invention. For example, carrier system alarms generally use special purpose scan points. As system maintenance becomes more complex, scan points become scarce and more costly. Also with most prior art carrier failure alarm arrangements the alarm circuit itself could fail and be unable to report a legitimate carrier system failure.

Accordingly, a need exists for a more economical and continuously self-testing method of detecting carrier transmission system failures.

DISCLOSURE OF THE INVENTION

The foregoing problem is solved and a technical advance is achieved by a method for detecting carrier system failures through the observance of signaling anomalies on the individual trunks served by the carrier system.

More specifically, each time an outgoing trunk is seized at the near end office, a register is attached at the terminating office to receive the called number to be transmitted from the near end. The near end is informed that the register is attached by the return of an acknowledgement signal over the trunk from the terminating office.

According to the proposed arrangement, if the acknowledgement signal is not returned within a prescribed interval, the call processor at the near end office first ascertains whether or not a failed trunk is associated with a carrier system. If the trunk is served by a carrier system, the processor selects another trunk served by the same system and transmits a seizure signal over this trunk to the terminating office. If the second trunk also fails to return an acknowledgement signal, it is presumed that the common carrier system is at fault and all trunks associated with the system are removed from service. All idle trunks are made busy and each trunk in any kind of a calling state is camped-on, that is, it will be made busy if and when it becomes idle.

The call processor then schedules periodic tests on the trunks to ascertain when the carrier system is restored to normal. The tests are made more frequently soon after the initial recognition of the carrier failure and less frequently if the failure condition exists for a prolonged period.

Upon the successful completion of two successive tests, it is assumed that the carrier system is no longer in trouble and steps are taken to return the trunks to service. Before restoring any trunks to service, however, the last trunk to fail is retested to assure that two individual trunk failures will not cause the entire group to be removed from service. If the last trunk to fail does not pass the test, only that trunk is removed from service. A successful test on the last trunk to fail causes all trunks to be restored to service.

To assist the reader in correlating the following description with the drawing, the first digit of each reference designation used herein corresponds to the figure number in which the designation appears.

DETAILED DESCRIPTION

Figure 1:
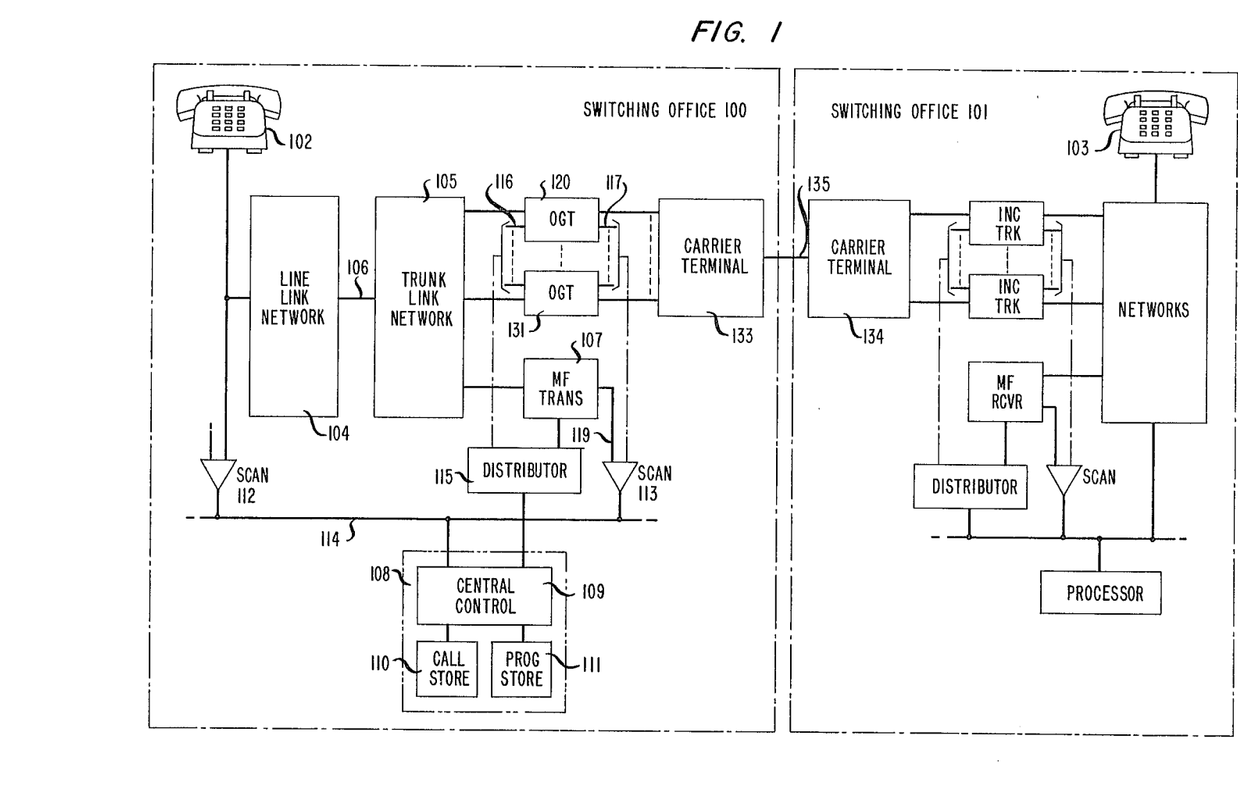
FIG. 1 shows, in block diagram form, a typical telephone system having two switching offices interconnected via trunks served by a carrier transmission system.

FIG. 1 shows a block diagram of a typical switching network comprising switching offices 100 and 101. While these offices are depicted as local offices serving customer stations, such as 102 and 103, these offices could also be toll or tandem offices which serve through traffic originating at other local offices.

By way of example, each of the switching offices is suitably an electronic program controlled switching office of the type disclosed in U.S. Pat. No. 3,570,008 to R. W. Downing et al of Mar. 9, 1971, and also disclosed in the *Bell System Technical Journal*, Vol. XLIII, No. 5, Parts 1 and 2, September, 1964. The system disclosed in these references is known as the NO. 1ESS and is manufactured by the Western Electric Co. A toll and tandem switching office also suitable for utilizing the invention is the NO. 4ESS of the same manufacturer and this system is disclosed in the *Bell System Technical Journal*, Vol. 56, No. 7, dated September, 1977. These citations may be referred to for a more comprehensive understanding of the construction and operation of the switching system, but a brief description will be given herein to illustrate how the invention functions within a switching system.

Switching office 100 comprises line link network 104, trunk link network 105, and a stored program controlled processor 108. Line link network 104 provides the terminations for customer stations such as 102, while trunk link network 105 provides the terminations for trunks, such as outgoing trunks 120 through 131, and for miscellaneous other circuits, such as multifrequency transmitter 107. The line and trunk link networks are connected via junctors 106 to permit the interconnection of lines, trunks, and service circuits for call processing under the control of processor 108.

The majority of the logic, control, storage, supervisory and translation functions required for the operation of this system are performed by central processor 108. Processor 108 is a data processing facility and can be functionally divided into a central control 109, a call store 110, and a program store 111 plus maintenance apparatus which has not been shown to simplify the drawing. The call store 110 is a temporary and erasable memory for storing information relating to calls in progress. This information includes the busy/idle status of circuits, the digits received and to be transmitted on various calls, the supervisory states of circuits, etc., as will be described in more detail below. The program store 111 is a permanent memory and stores translation tables and routing information in addition to the program instructions which direct the central control to sequentially perform its many functions.

The central control 109 is the information processing unit of the system and executes the program instructions listed in the program store 111 using information temporarily stored in call store 110.

Processor 108 interfaces with lines, trunks, and service circuits via scanners 112 and 113 and distributor 115. Distributor 115 responds to an order over a bus system 114 from the central control to apply pulses to distribution points connected to the peripheral units of equipment. For example, in response to the appropriate order, distributor 115 signals over conductor 116 to actuate apparatus such as a relay in trunk circuit 120.

Scanners 112 and 113 are used to gather information for central control 109 by monitoring leads connected to the various peripheral units. Thus, when a trunk circuit such as 120 changes state as a result of an acknowledgement from the distant terminating office, a signal is transmitted via conductor 117 to scanner 113. Similarly, scanner 113 recognizes changes of state in transmitter 107 via conductor 119. Periodically, the scanners are addressed by central control 109 over bus system 114 to ascertain any changes of state in the peripheral units.

Switching office 101 basically comprises the same units of equipment as switching office 100 and need not be described in detail herein.

The twelve outgoing trunks 120 through 131 are all in the same group to serve calls destined for switching office 101, and for economical reasons these trunks are served by a carrier transmission system comprising terminals 133 and 134 which are interconnected via transmission link 135. Carrier transmission systems are well known in the art and a typical system is disclosed in U.S. Pat. No. 2,695,332 to R. S. Caruthers of November 23, 1954. The system disclosed in the Caruthers patent is a frequency divided analog system, that is to say, each of the twelve channels occupies a distinct band of frequencies and in-band signaling is used to exchange supervisory signals between the switching offices.

When the customer at station 102 originates a call for station 103, processor 108 connects a receiver (not shown) over the networks to station 102 to receive the number dialed by the customer. After sufficient digits have been received, central control 109 translates the digits into routing instructions which direct the processor to memory tables in program store 111 which, in turn, identify the trunks in the group to switching office 101.

Trunks such as 120 through 131 use the well known "E & M" signaling, that is to say, signals are forwarded by changing the potential on the near end "M" lead and signals received from the distant end are recognized by a change in potential on the near end "E" lead. More specifically, in response to the actuation of an "M" lead, a tone is transmitted over the carrier system to the far end to actuate the "E" lead thereat.

The sequence of signals exchanged between offices prior to the transmittal of the called number depends on the type of switching equipment at the destination office. Two of the more familiar signaling sequences are referred to as the "delay-dial-start-dial" and "wink start". With a delay-dial-start-dial trunk, it is expected that a register at the distant end will be attached and ready to receive the called number within 440 milliseconds. Failure to receive the delay-dial signal within the prescribed interval is sometimes referred to as an "integrity check failure" (IKF). With wink-start trunks, a start-dial (register attached signal) can be delayed due to congestion in common equipment at the terminating office in addition to a trunk or carrier system failure. Accordingly, when these trunks are being used, the time for declaring a carrier system failure is delayed to allow for any possible central office congestion to subside. Absence of an acknowledgement signal from the destination office on a wink-start trunk is sometimes referred to as a "no-start dial" (NSD).

While only these two types of signaling sequences are referred to in this disclosure, it will be obvious that trunks having other signaling arrangements can utilize the carrier system failure detecting arrangement without departing from the spirit and scope of the invention.

A description of the carrier detecting method can best be appreciated with reference to the flow diagrams of FIGS. 2-7. The sequence of operation begins with the sending of a seizure signal over one of the trunks 120 through 131 in attempting to forward a service call from a customer station. Central control 109 scans the trunk circuit looking for a start-dial signal from the terminating office and if the signal is received within a prescribed interval, transmitter 107 is attached to the outgoing trunk circuit via the trunk link network 105. Once the transmitter is attached outpulsing can begin. This is set forth in blocks 201-203 of FIG. 2.

The term "start-dial" is being used herein in a generic sense regardless of the signaling sequence used on the trunk and it refers to the signal returned from the terminating office to acknowledge that the equipment thereat is ready to receive digits to be transmitted from the near end office.

Figure 2:
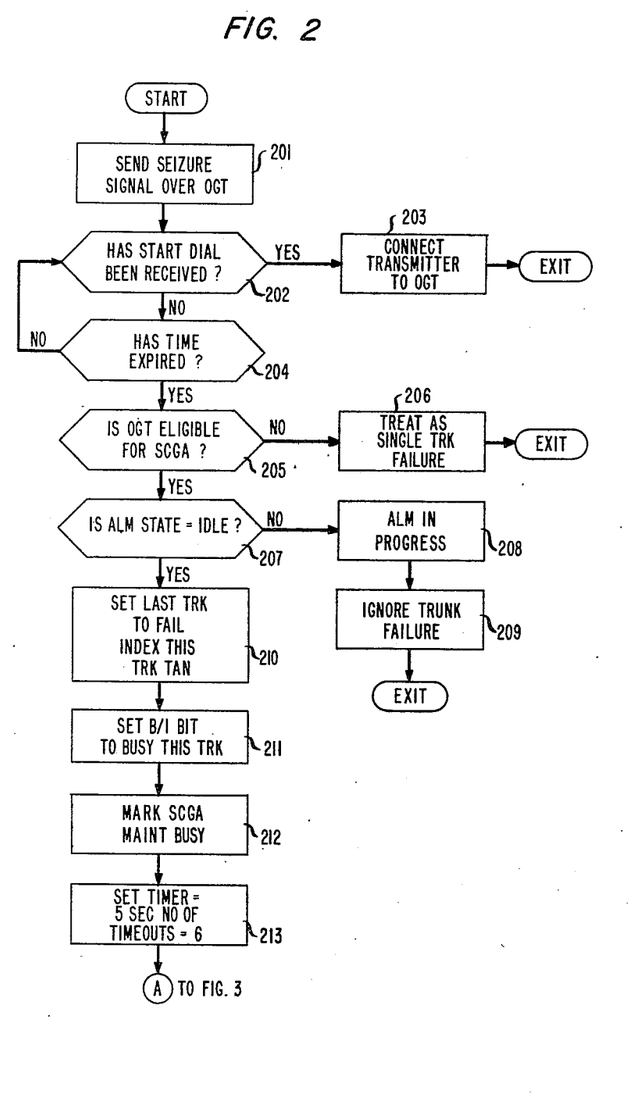
FIGS. 2-7 disclose flow diagrams of the sequence of operations of the switching offices shown in FIG. 1.

Let it be assumed that the start-dial signal has not been received. Central control 109 interrogates a table in its program store to ascertain if the trunk is served by a carrier system. If the trunk is not a carrier type trunk, the trunk is taken out of service and the trouble is treated as a single trunk failure as shown in the blocks 204–206. Since these trunks are carrier type trunks, central control 109 examines the software carrier group alarm table (FIG. 8) and reads the alarm word associated with the carrier system serving the trunk group to ascertain the current status of the alarm state.

Each carrier group has an alarm word associated therewith and the alarm word includes several entries including the alarm state, timing information, a trunk queue index and a last trunk to fail index. The alarm state entry can be set to any one of nine different alarm states listed in FIG. 8 and these will be described in more detail below. The timer and number of timeouts entries in the alarm word are used to time the testing sequences when a carrier failure has been detected, while the trunk queue and last trunk to fail indices store the identity of trunks to be tested by the central control.

If the central control found the alarm state set in any other condition but IDLE, the central control would follow the sequence of blocks 207 and 208 determining that the carrier alarm was already in progress and ignore the current failure to receive a start-dial signal.

Having found the alarm state IDLE, central control 109 sets the last trunk to fail index equal to the trunk appearance number (TAN) of the trunk that just failed as shown in block 210. Central control 109 also marks this trunk "software carrier group alarm maintenance busy" (SCGA) as shown in block 212 to prevent this trunk from being used by the processor on the next trunk test. Based on the results of the next test, the processor will ascertain if the failure encountered thus far is an isolated trunk failure or a carrier failure affecting many trunks. Central control 109 also sets the timer in the SCGA table of FIG. 8 to 5 seconds and the number of timeouts equal to six as shown in block 213.

Figure 3:
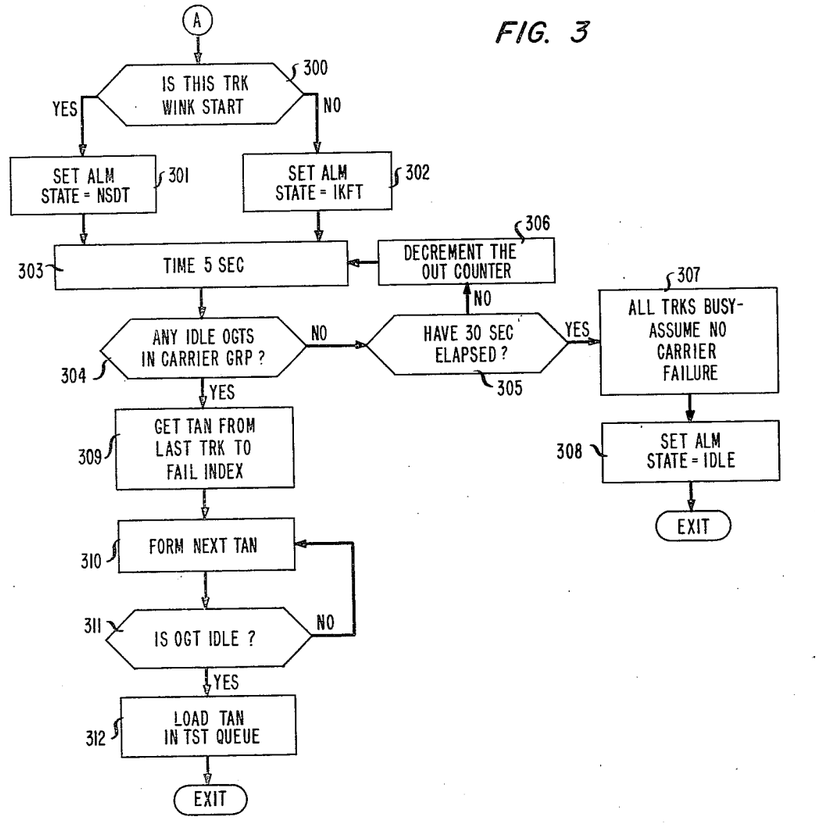

Central control 109 now determines if this is a delay-dial-start-dial trunk or a wink-start trunk as set forth in decision block 300 of FIG. 3. Assuming that the trunk is a delay-dial-start-dial trunk, central control 109 sets the alarm state in the SCGA table to IKFT and begins timing before making any further tests. If the trunk were a wink-start trunk, the alarm state would be set to NSDT.

Figure 8:
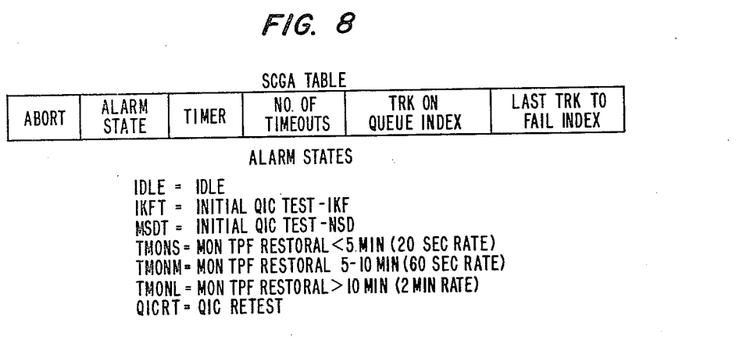
FIG. 8 shows a typical example of a software carrier group alarm table which is part of the memory in a switching office.

At the end of 5 seconds, central control 109 checks to determine if there are any idle outgoing trunks in the group. If there are no idle trunks, the timeout counter is decremented and central control 109 times for another 5 seconds. If no idle trunks are found after 30 seconds, it is assumed that some of the busy trunks must be occupied on service calls and there is no carrier failure. The alarm state in table SCGA is then reset to IDLE as shown by the operation block 308 and the central control exits this program. If there are idle trunks in the group, the trunk appearance number of the last trunk to fail is read from the last trunk to fail index and a new trunk appearance number is formed in preparation for testing another trunk in the same group. The trunk appearance number of an idle trunk is formed and loaded into a trunk queue as shown in blocks 310–312. Central control 109 exits this portion of the program and continues the routine processing of other work.

In connection with scheduled routine maintenance and test work, central control 109 periodically empties the trunk test queue and performs a "quick integrity check" test on the trunk identified by the trunk appearance number in the queue. This test simulates a service call and is performed by sending a seizure signal over the trunk and waiting the prescribed interval for a start-dial signal to be returned from the distant office. As set forth in the blocks 400–405 of FIG. 4, the central control waits 440 milliseconds or 25 seconds for a start-dial signal depending on the type of trunk being tested. If the test passes, central control 109 follows the "YES" branch of the flow diagram from decision block 404.

Figure 4:
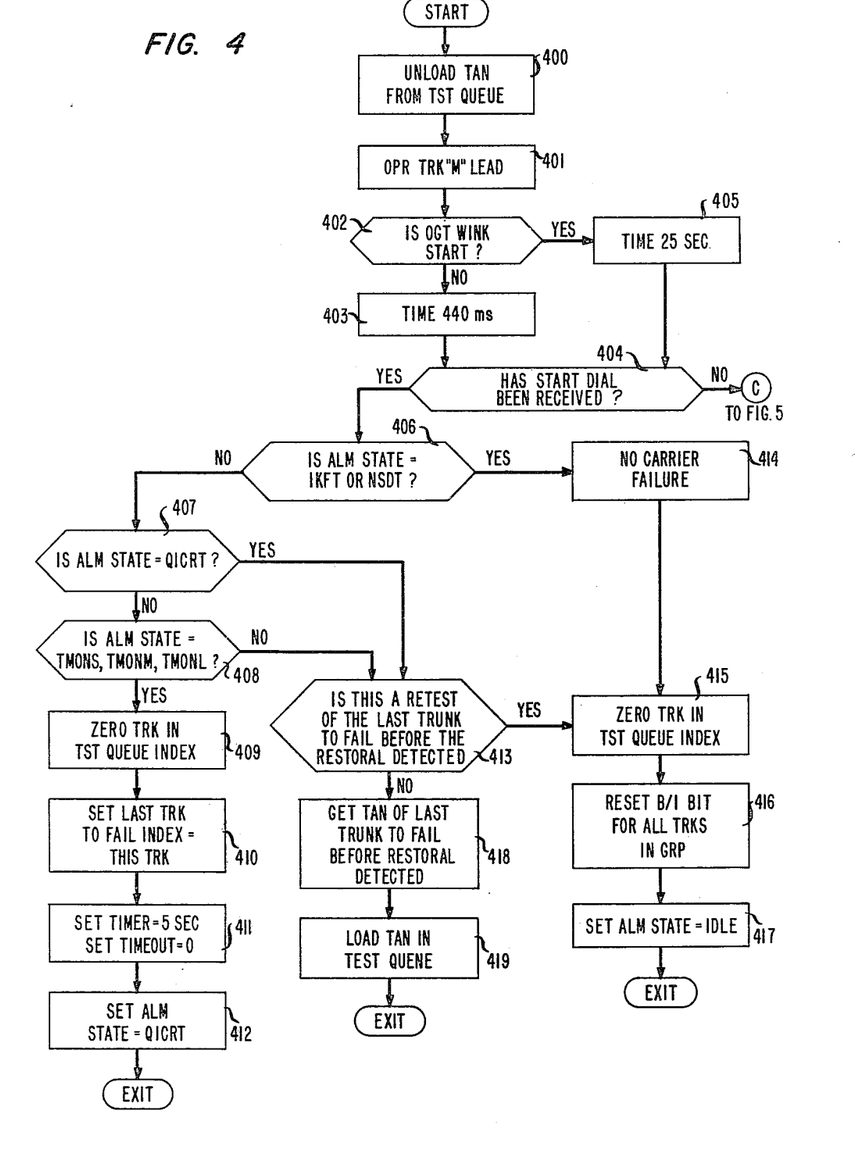

The central control waits 25 seconds on winkstark trunks to assure that the failure to receive a start-dial signal is not due to terminating office traffic congestion which would normally subside within this interval. This waiting interval can be eliminated if the central control is sure that a carrier system failure has occurred as manifested by a start-dial signal not being returned on a second trunk in the group. Also, the 440 millisecond interval on delay-dial-start-dial trunks might be increased for certain trunks, such as satellite trunks, due to the longer transmission delays.

Let it be assumed, however, that this trunk also fails to pass the quick integrity check test and central control 109 will treat this second trunk failure as an indication of a complete carrier system failure. Central control 109 executes the program sequence following the "NO" branch out of decision block 404 to decision block 500 in FIG. 5 and determines if the alarm state is either IKFT, NSDT, or QICRT. It will be recalled that, as a result of the first trunk to fail, the alarm state had been set to IKFT indicating the initial trunk failure of a delay-dial-start-dial trunk. Now having failed an integrity check on the second trunk of the carrier group, central control 109 will proceed to remove the trunks from service and begin a periodic monitoring of the trunks for a restoral of the carrier system. As shown in the blocks 501 and 502, central control 109 sets the trunk queue index to "0" and resets the last trunk to fail index to store the trunk appearance number of the trunk which just failed. If the alarm state is not QICRT, the alarm state is set to TMONS and subroutine SCGA-RMV-TRKS is called to busy the trunks in the failed group. The QICRT alarm state is normally encountered during the restoral of a carrier failure and will be described below.

Figure 5:
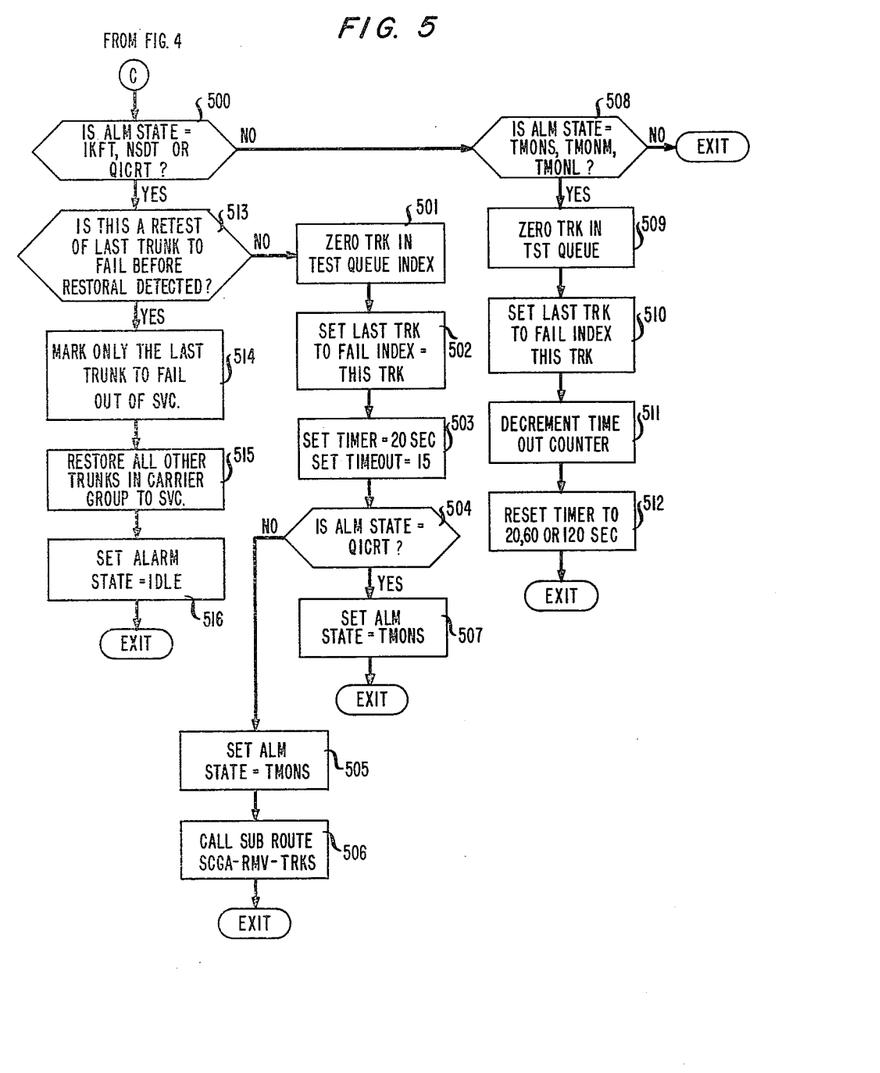
Figure 6:
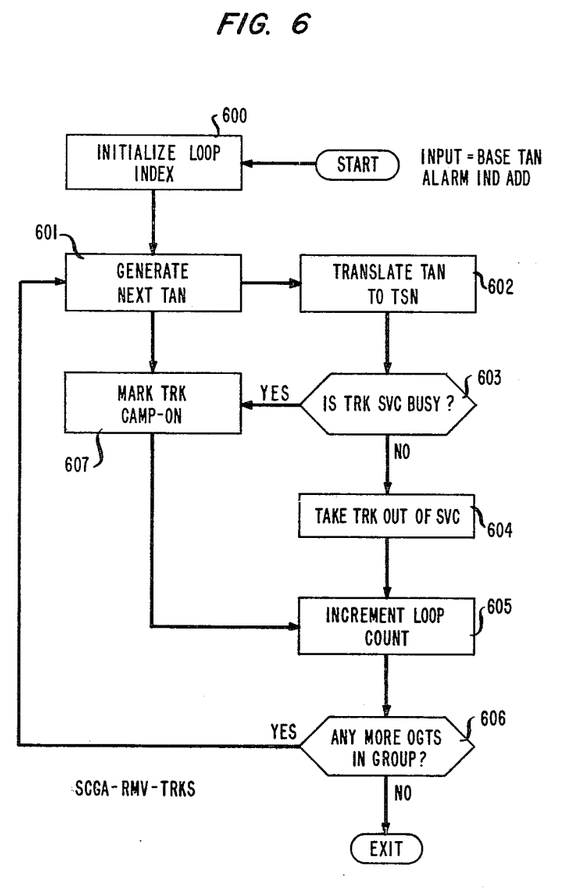

By setting the alarm state to TMONS, central control 109 will schedule the short term monitoring of the trunks associated with the failed carrier system to detect when the carrier system has been restored to normal. In the TMONS alarm state, a series of quick integrity check tests is made with each test being made on a different trunk in the group. Since the timer has been set to the 20 second rate and the timeouts entry to fifteen, as shown in operation block 503, central control 109 will schedule these tests over a 5 minute period with each new test being run every 20 seconds. The central control now calls a subroutine designated SCGA-RMV-TRKS which is shown in FIG. 6 of the drawing.

Subroutine SCGA-RMV-TRKS is a sequence of operations designed to remove the 12 trunks associated with the failed carrier system from service. The input to the subroutine is the base trunk appearance number and the alarm word address. A loop index is initialized to indicate the number of times this subroutine will be executed and the central control forms the trunk appearance number of the first trunk in the group. The trunk appearance number is translated to a trunk scan number (TSN) and the busy/idle condition of the trunk is examined. If the trunk is idle, the trunk is taken out of service. If the trunk is busy, however, the trunk is marked "camp-on" and the trunk will be removed from service if and when it becomes idle.

The loop count is incremented and the procedure of making trunks busy continues until all trunks in the group have been made busy or marked "camp-on".

Up to this point in the sequence of operations of the system, two trunks have failed to return a start-dial signal and all trunks associated with the same carrier system have been removed from service. Also, the alarm state has been set to the short monitor interval to look for a carrier system restoral. Central control 109 examines the alarm word every second and decrements the timer which had been set to 20. When the timer is decremented to 0, the central control enters the program depicted by the flow diagram in FIG. 7. The alarm state is read by the central control and the number of timeouts is ascertained to determine how long the system has been in the short interval monitoring state. If the system has been in the TMONS state less than 5 minutes, a new trunk appearance number is loaded in the queue for a quick integrity check as shown in operation blocks 703–705. Specifically, the last trunk to fail index is read and incremented to form a new trunk appearance number. The new trunk appearance number is loaded in the trunk queue and scheduled for testing by the central control.

As described above, the central control periodically unloads the trunk queue and performs a quick integrity check test on the trunk in accordance with the flow diagram shown in FIG. 4. If the test fails, the central control sets the queue to 0, updates the last trunk to fail index with the trunk appearance number of the trunk being tested, and decrements the number of timeouts counter. The central control also resets the timer to 20 seconds. At the end of the next 20-second interval, the program subroutine shown in FIG. 7 is once again entered.

Figure 7:
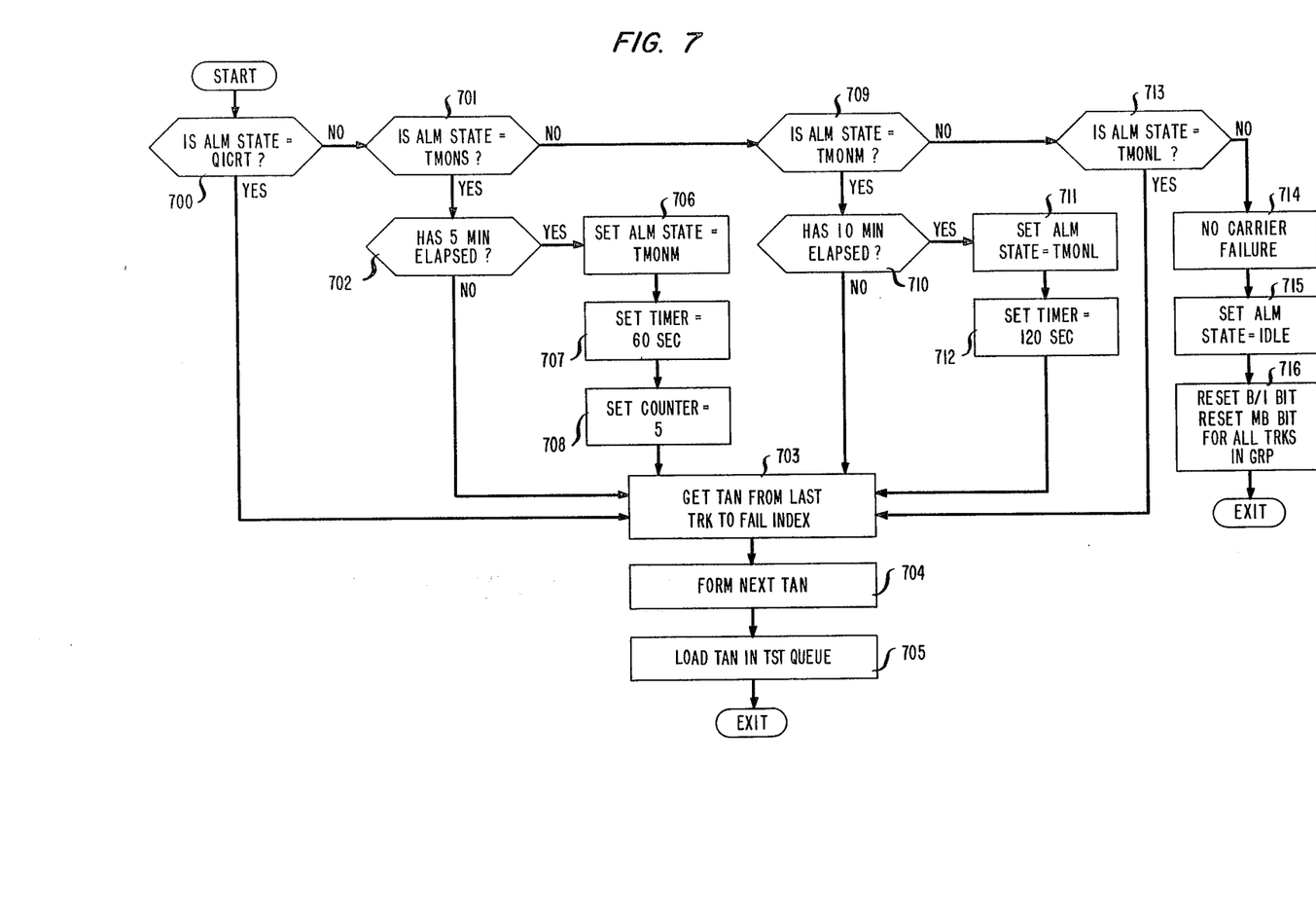

Each time the program in FIG. 7 is entered, a different trunk is tested and as long as the trunk being tested fails, the central control will loop through the program performing a quick integrity check test every 20 seconds for the next 5 minutes. If at the end of 5 minutes the quick integrity check still fails, central control 109 sets the alarm state to the medium monitoring interval designated TMONM. The timer is also set to 60 seconds, and the timeout counter is set to 5.

In the TMONM mode, outgoing trunks are tested every 60 seconds for a period of 5 minutes as shown in the flow diagram of FIG. 7. At the end of 10 minutes, if the quick integrity check still fails, the timer is set to 120 seconds and the alarm state is set to TMONL. The TMONL state causes the central control to perform a quick integrity check every 2 minutes until the carrier system is restored to normal. Thus, the frequency of testing the trunks for the restoral of the carrier system decreases as the duration of the system failure increases. During the early stages of a carrier failure, a quick integrity check is made every 20 seconds. The time between tests is increased to 1 minute if the carrier system is not restored within the first 5 minutes and then the tests are performed at 2 minute intervals until the carrier system is finally restored to service.

If during any of the three monitoring states (TMONS, TMONM, and TMONL), the quick integrity check test passes as determined by the return of a start-dial signal from the distant switching office, central control 109 will execute the program sequence beginning with the "YES" branch out of decision block 404 in FIG. 4. The central control first determines what the current alarm state is and, assuming that the alarm state is one of the monitoring alarm states (TMONS, TMONM, and TMONL), the processor will clear the trunk queue index and reset the last trunk to fail index to the trunk appearance number of the trunk being tested as shown in blocks 408–410. The timer is now set to 5 seconds and the timeouts counter to 0, and the alarm state is set to QICRT. The central control then exits this portion of the program.

The QICRT alarm state prepares the system for another quick integrity check test on a different trunk since, according to a feature of the invention, there has to be at least two trunks passing this test before the carrier system can be considered back in service.

As mentioned above, the central control periodically examines the alarm word to determine what action is necessary if the alarm state has been set to any condition but IDLE. When the central control reads the alarm state on the next cycle and finds the alarm state set to QICRT, the central control takes the trunk appearance number from the last trunk to fail index, forms a new trunk appearance number, and loads the new trunk appearance in the trunk queue as shown in FIG. 7 blocks 703–705.

When the trunk queue is unloaded as shown in FIG. 4, the quick integrity check test is performed according to the flow diagram including blocks 400–405. Assuming that the quick integrity check passes and a start-dial signal is detected over the trunk being tested, the central control now reads the alarm word to ascertain the alarm state. Since the alarm state had been set to QICRT and this is the second trunk to pass a quick integrity check, the processor executes the program represented by blocks 413 and 415–419. Namely, the central control first determines if the second trunk to pass the quick integrity check test is the trunk listed in the last trunk to fail index as shown in decision block 413. If the last trunk to fail has not been retested, its trunk appearance number is loaded in the test queue and scheduled for a retest as shown in blocks 418 and 419. Once the last trunk to fail retests okay, queue index is set to 0, the trunks associated with the carrier system are restored to service, and the alarm state is set to IDLE as shown in blocks 415–417. Should the last trunk to fail not retest okay, the program represented by blocks 513–516 is executed to remove this trunk from service as a single trunk failure.

If the last trunk to fail were not retested in this manner before the carrier system is considered restored to normal, two individual trunk troubles could cause the central control to enter repeatedly the aforementioned trunk make busy sequence only to restore the trunks to normal each time two other trunks pass the test.

Thus, it can be seen from the foregoing description that carrier system failures are detected by monitoring the signaling on the carrier trunks. When a signaling irregularity is detected on at least two trunks, all trunks served by the carrier system are removed from service. The trunks are then periodically tested to determine when the carrier system has been restored to service. At least two trunks, including the last trunk to fail, must pass the test before the system can be considered back in service.

Of course, it is to be understood that the arrangement described is merely illustrative of the application of the principle of the invention and numerous and other varied arrangements may be utilized without departing from the spirit and scope of the invention.

We claim:

1. In a telephone switching system a machine method for ascertaining a carrier transmission system failure comprising the steps of
   detecting a service call failure of a trunk,
   ascertaining if the trunk is in a group served by said transmission system,
   testing at least one other trunk in the same group,
   removing from service all trunks in the group as a result of a failure of said test,
   retesting individual ones of the trunks removed from service, and
   restoring all trunks in the group to service upon the successful completion of said retest.

2. The method set forth in claim 1 wherein the step of removing trunks from service comprises the steps of
   ascertaining the busy/idle condition of all trunks in the group,
   busying all trunks ascertained to be idle, and
   camping on all trunks ascertained to be busy.

3. The method set forth in claim 1 wherein the step of detecting a service call failure comprises the step of recognizing the absence of an acknowledgement signal from a terminating office.

4. The method set forth in claim 1 wherein the steps of testing and retesting each comprise the steps of sending a seizure signal over a trunk to a destination office and detecting the return of an acknowledgement signal from said terminating office within a predetermined interval.

5. The method set forth in claim 4 wherein the steps of testing and retesting each further comprise the steps of selecting one of a plurality of predetermined time intervals corresponding to said terminating office.

6. The method set forth in claim 1 wherein the step of retesting trunks comprises the steps of sending a seizure signal over a first one of said trunks,
   waiting for a preselected time interval, and
   sending a seizure signal over a second one of said trunks at the end of said time interval.

7. The method set forth in claim 6 wherein the step of retesting trunks further comprises the step of altering said preselected time interval according to the time interval between removing the trunks from service and retesting the trunks.

8. The method set forth in claim 1 wherein the step of restoring all trunks to service is effective only upon the successful retesting of a plurality of trunks.

9. The method set forth in claim 1 wherein the step of retesting includes the step of identifying the last trunk to fail said retest, and
   wherein the step of restoring includes the step of retesting said last trunk to fail.

10. In a telephone switching system a machine method for ascertaining a carrier transmission system failure comprising the steps of
    detecting on a service call from an originating office the failure of a trunk to receive a sender attached signal from a terminating office,
    ascertaining if the failed trunk is in a group served by a carrier system,
    ascertaining if any other trunks in the group are idle,
    transmitting a seizure signal over one of said other idle trunks,
    removing from service all trunks in the group as a result of a failure to receive a sender attached signal over said other trunk,
    retesting selected individual trunks in the group by transmitting a seizure signal over each selected trunk, and
    restoring to service all trunks in the group when a sender attached signal is received over at least two trunks selected for retesting.

11. The method set forth in claim 10 wherein the step of retesting includes the step of scheduling the retesting of trunks at a first rate and altering the rate according to interval of time after the removal of the trunks from service.

* * * * *